Patented Sept. 16, 1947

2,427,398

UNITED STATES PATENT OFFICE 2,427,398

HEAT-CONDUCTIVE LUTING MATERIAL

William C. Ferguson and Paul Sussenbach, St. Louis, Mo., assignors to The Presstite Engineering Company, St. Louis, Mo., a corporation of Missouri No Drawing. Application August 7, 1943, Serial No. 497,850

2 Claims. (Cl. 106—289)

This invention relates to luting materials, and with regard to certain more specific features, to heat-conductive luting materials.

The invention is an improvement upon that shown in United States Patent 2,311,526, dated February 16, 1943.

Among the several objects of the invention may be noted the provision of a heat-conducting luting material of the general type described in said patent but which is more effective and less costly, and which does not involve the use of any, or at least not as much of the metallic component which is sometimes not as available as the basic heat-conducting material used herein; and the provision of a material of the class described which involves little or no material having an objectionable odor. Other objects will be in part obvious and in part pointed out hereinafter.

The invention accordingly comprises the ingredients and combinations of ingredients, the proportions thereof and features of composition, which will be exemplified in the products hereinafter described, and the scope of the application of which will be indicated in the following claims.

Since the field of use of the present invention is amply described in said patent, this will not be repeated, except briefly to state that the material has for its basic purpose the formation of an improved heat-conducting connection between heat-conducting components of heat transfer apparatus; for example, a connection between the cooling coils and the metal walls of a refrigerating compartment. It takes the place of the more ordinary soldering or welding for the purpose. It has all of the advantages of the material described in said Patent 2,311,526, plus those above mentioned, and to be mentioned hereinafter.

The new substance is constituted by a suitable gum or plastic base, such as for example a soft petroleum resin, such as petroleum, asphalt, or asphalt resin, heated together with a medium of relatively non-volatile, odorless oil, such as for example a petroleum motor lubricating oil of S. A. E. viscosity 50 (which is non-drying), or a polymerized non-drying oil of a heavy tacky nature. For example, by weight 35 parts of petroleum lubricating oil may be blended with 15 parts of the said asphalt or asphalt resin at a temperature of approximately 250 degrees F. This forms the desired vehicle.

To the above vehicle may also be added a small quantity of crepe rubber, rubber resin or similar compound such as the available synthetic plastics, which improves the stretchability and ductility of the plastic base. For example, .025 to .500 part of crepe rubber by weight may be introduced into the above mixture. In order properly to insert the crepe rubber, it is first blended or dispersed with a suitable plasticizer such as a refined mineral oil and then worked into said vehicle.

The vehicle above described and the stretch yielding material are worked together to form a homogeneous base. On the same weight proportional basis, approximately 50 parts of flake or granular, preferably flake graphite, are worked into the base and thoroughly disseminated therethrough. It is preferable that the temperature during mixing be maintained above 220 degrees F., which causes the surface moisture to volatilize whereby a better product is obtained. If granular graphite is used it should preferably pass through a 300 mesh screen. Flake graphite however is preferable because its heat conductivity is higher and it produces better final working characteristics. Also, even though it is in a soft mix it will not slump or flow after application.

The product made as above described with the materials mentioned possesses all the qualities heretofore designated as desirable in compositions of this type. It is plastic and may be worked into place with a knife or putty gun. In addition, the graphite has a high heat conductivity when in the compound described. It is equal to or better than the conductivity of the pure metal particles heretofore used. Its working characteristics are as good as, or better than, the prior metallic materials used and it is much less in cost. Besides graphitic materials are not as critical as metal ones during war time.

Furthermore, when metal particles only are used as heat conductors they need to be prevented from becoming dull; otherwise heat conductivity is impaired. This requires some substance in the compound to keep the metal particles bright. For this purpose stearic acid is often used or a similar substance, the odor of which it is desired to avoid, if possible. No such material is required if, as above described, only graphitic particles are used as primary heat conductors. Therefore, it is to be seen that there is no problem of odor involved, so far as is concerned any addition of an anti-dulling material.

If it is desired to use the product around oily parts, such as machine parts, a non-oil-soluble vehicle may be used. For example certain synthetic resins possess this feature of non-oil solubility. A particular example is an alkyd resin. These also have the advantage that they may be painted over which is desirable in some locations.

While it is to be understood from the above that the primary feature of the invention is the use of a substantial amount of granular or flake graphite for the primary heat conducting component of the substance, that metallic particles may additionally be used if desired for various purposes. For example aluminum or copper flakes may be added to improve color. They do not improve the heat conductivity substantially. If the aluminum or copper are added as granules, such as filings, they do perform heat conducting functions. Their heat conductivity may also be further improved by the addition of salts or oxides or fine particles of heavy metals such as red lead and blue lead in amounts equal to about 25% by weight. In these cases where metallic particles are used in addition to the graphite or carbon, the vehicle will be improved by the addition of a soap of the alkaline earth metals such as calcium or magnesium, strontium or barium or other inert metals such as aluminum or zinc may be used. The preferred soap is made from stearic acid, but other saturated or unsaturated fatty acids having 12 to 22 carbon atoms may be used. Soap may be used in the proportion of .1% to 2.0% of the luting compound by weight. In addition small amounts of stearic acid may then be desirable.

If metallic particles as distinguished from flakes, are used in addition to the graphite particles they apparently form a relatively coarse matrix, having a low amount of contact area, the transmission of which is increased by the graphite particles which are infilled between the often coarser particles of the metallic matrix. In other words the fine graphite particles seem to have the effect of increasing the homogeneity of the heat conducting phases of the mixture whether used alone or with metallic particles.

It will be understood that while the quantities stated are those which have been found to be effective, variations are possible. For example as high as 65 parts by weight of graphite to approximate 35 parts by weight of vehicle have been used with success; and, where aluminum filings have been used with the graphite the amount of graphite has been reduced to as low as 25% by weight. In this latter case 50% by weight of aluminum filings are used which will go through a 48 mesh screen while the graphite granules, if not flake, should go through a 300 mesh screen. The total of the graphite and aluminum in such a case may be 75% by weight and the remainder of the product was made up by 25% by weight of vehicle.

The resulting material resembles very much an ordinary putty or caulking material, except that it is made of graphite with or without the oxides of heavy metals, and with or without the addition of metal flakes, aluminum, copper, silver and lead, or granules of these or other heavy metals. It can be applied either with a gun or with a putty knife, and its ability to transfer heat from the walls of the container to the copper tubing approximates that of solder.

Inasmuch as the material is to be used in cabinets which are to be used for food storage and which are shipped from the factory to the point of use, there are several characteristics which the plastic base should have for maximum utility. In the first place, the plastic base itself should have as high heat transference characteristics as practicable, for such a class of materials.

In the second place, the plastic base should be practically odorless, for most materials having an odor are generally unsuitable for use in connection with foods. The plastic base should also be highly adhesive to metal surfaces so that jarring will not loosen it from either the pipe or the walls of the container. It should also be non-oxidizing so that it will not harden and eventually crack away from either of the surfaces to which it is attached. Furthermore, it should have a low susceptibility factor, that is to say it should retain its desired plastic characteristics without substantial impairment at maximum Summer temperatures of the order of 150° F. and minimum Winter temperatures of the order of —40° F. without becoming runny or brittle.

The invention has all of the above desired characteristics.

In view of the above, it will be seen that the several objects of the invention are achieved and other advantageous results attained.

As many changes could be made in the above constructions without departing from the scope of the invention, it is intended that all matter contained in the above description shall be interpreted as illustrative and not in a limiting sense.

We claim:

1. A heat conducting luting material comprising a substantially permanently plastic vehicle as the base, said base comprising an ingredient selected from the class consisting of soft petroleum resin and asphalt resin blended with a non-volatile, non-drying petroleum lubricating oil, and a substantial proportion of finely divided graphite dispersed therethrough, the proportion of graphite consisting by weight of from 25 to 65%.

2. A heat conducting luting material comprising a substantially permanently plastic vehicle as the base, said base comprising an ingredient selected from the class consisting of soft petroleum resin and asphalt resin blended with a non-volatile, non-drying petroleum lubricating oil, and flake graphite particles dispersed therethrough in the proportion of approximately 50% by weight of the material.

WILLIAM C. FERGUSON.
PAUL SUSSENBACH.

REFERENCES CITED

The following references are of record in the file of this patent:

UNITED STATES PATENTS

| Number | Name | Date |
|---|---|---|
| 2,316,778 | Fuchter | Apr. 20, 1943 |
| 2,330,502 | Longman | Sept. 28, 1943 |
| 2,311,526 | Ferguson | Feb. 16, 1943 |
| 1,828,182 | Golding | Oct. 20, 1931 |
| 1,559,731 | Muller | Nov. 3, 1925 |
| 853,117 | Richardson | May 7, 1907 |
| 2,323,461 | Donelson | July 6, 1943 |
| 231,540 | Collins | Aug. 24, 1880 |
| 1,122,883 | Edmiston | Dec. 29, 1914 |

OTHER REFERENCES

Materials Handbook, Brody, 1st edition, McGraw-Hill, pages 174–175.